United States Patent
Bologna et al.

(10) Patent No.: US 9,820,086 B2
(45) Date of Patent: *Nov. 14, 2017

(54) WAVEGUIDE WITH PORTS FOR NEAR FIELD COMMUNICATION

(71) Applicant: Dell Products L. P., Round Rock, TX (US)

(72) Inventors: Benny J. Bologna, Austin, TX (US); Jason Scott Morrison, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,713

(22) Filed: Oct. 21, 2016

(65) Prior Publication Data

US 2017/0048653 A1 Feb. 16, 2017

Related U.S. Application Data

(63) Continuation of application No. 14/726,925, filed on Jun. 1, 2015, now Pat. No. 9,538,315.

(51) Int. Cl.
*H04M 1/00* (2006.01)
*H04W 4/00* (2009.01)
*H04B 5/00* (2006.01)
*H04W 4/02* (2009.01)

(52) U.S. Cl.
CPC .......... *H04W 4/008* (2013.01); *H04B 5/0031* (2013.01); *H04W 4/023* (2013.01)

(58) Field of Classification Search
CPC .... G06K 19/0723; G06K 7/0008; H04B 5/02; H04B 5/0012; H04B 5/00; H04B 1/3833; H04B 1/385; H04W 84/18; H04W 88/06; H04W 76/02; H04M 1/0214; H04M 1/0216; H04M 1/0245; G06F 1/1616; G06F 1/1656; G06F 1/1679; G06F 1/1681
USPC ............. 455/41.1, 41.2, 550.1, 77, 78, 90.3, 455/575.3, 575.5; 361/679.09, 679.26
See application file for complete search history.

(56) References Cited

U.S. PATENT DOCUMENTS 9,300,365 B1 * 3/2016 Aoki ..................... H04B 5/0031
9,444,525 B2 * 9/2016 Pelissier ............... G06F 1/1632
9,538,315 B2 * 1/2017 Bologna ............... H04W 4/008

* cited by examiner

*Primary Examiner* — Nhan Le
(74) *Attorney, Agent, or Firm* — Campbell Stephenson LLP; Shiv S. Naimpally

(57) ABSTRACT

A computing device comprises a head that can be docked to a base. The base includes a base transceiver to transmit (or receive) a signal via a first port of a waveguide. The waveguide also includes at least a second port and a third port. The head includes a head transceiver to transmit (or receive) the signal via the waveguide. When the head is in a first position relative to the base, the head transceiver may transmit (or receive) the signal via the second port. When the head is in a second position relative to the base, the head transceiver may receive transmit (or receive) the signal via the third port.

20 Claims, 10 Drawing Sheets

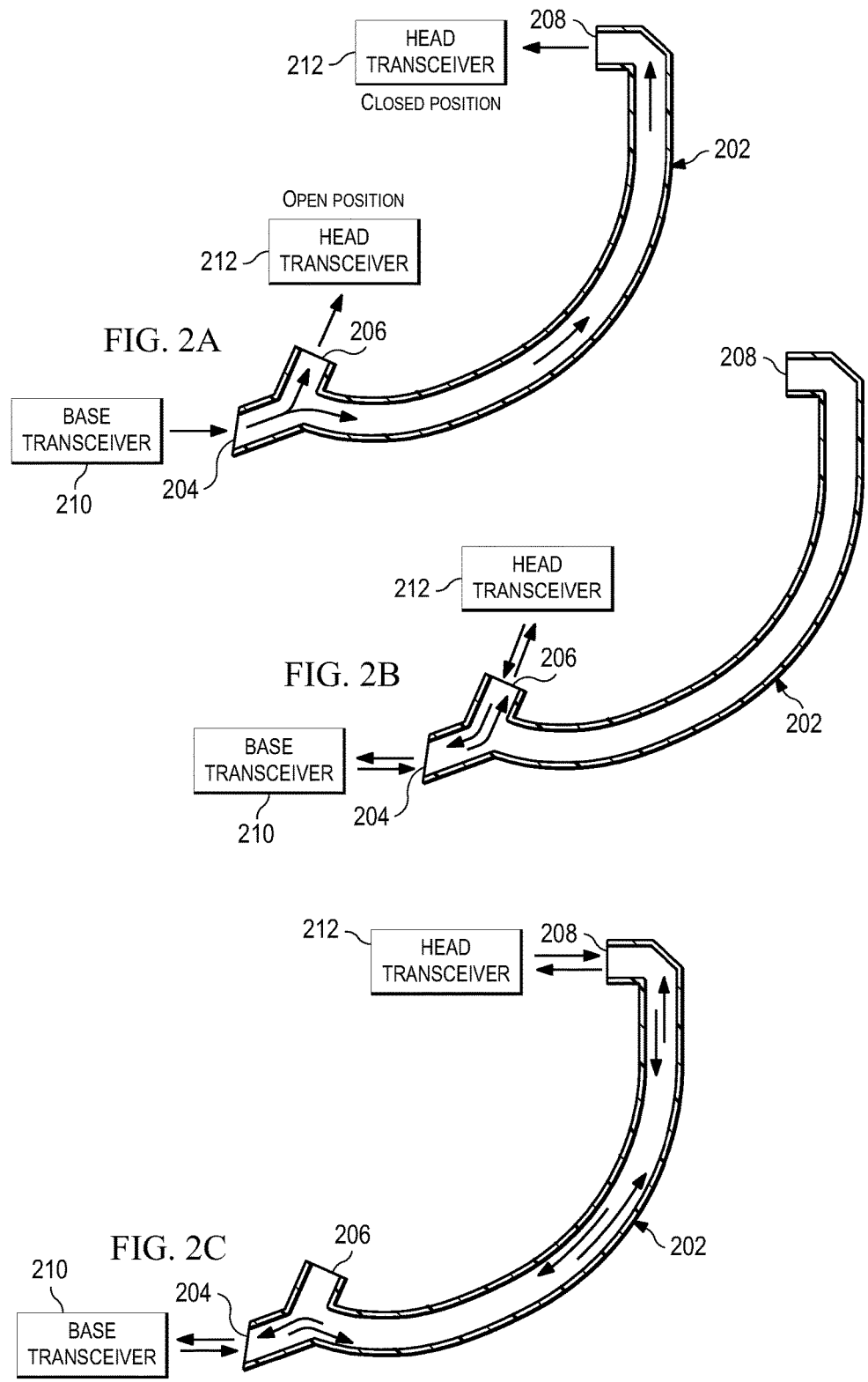

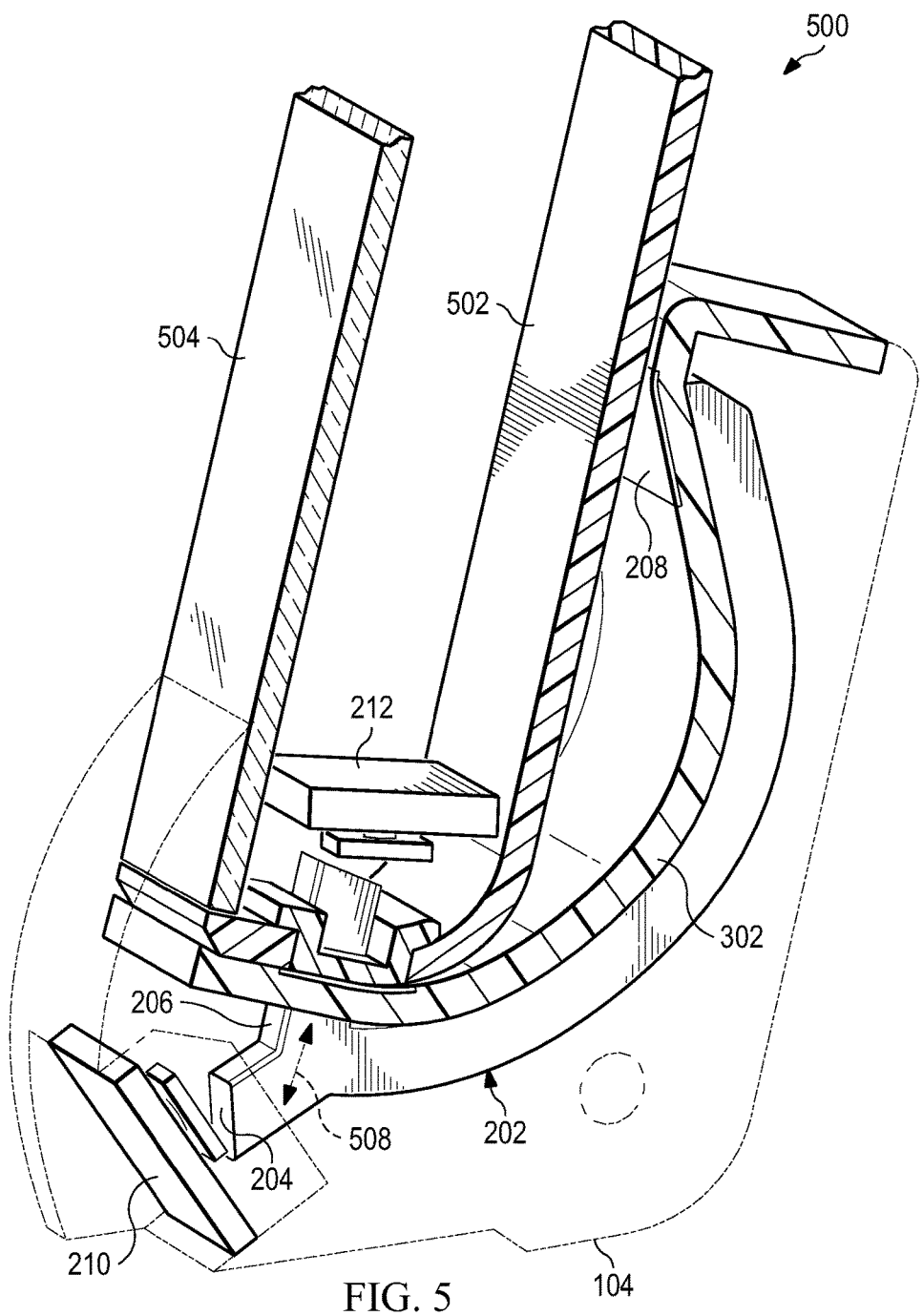
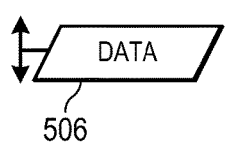
FIG. 5

WAVEGUIDE WITH PORTS FOR NEAR FIELD COMMUNICATION

CROSS-REFERENCE TO RELATED APPLICATIONS

The present patent application is a continuation of U.S. patent application Ser. No. 14/726,925, filed on Jun. 1, 2015, entitled "Waveguide with Ports for Near Field Communication" and is incorporated by reference herein in its entirety and for all purposes as if completely and fully set forth herein.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In short-range wireless communication, an antenna that is smaller than a wavelength of the carrier signal may be used to transmit the carrier signal. The antenna may produce an electric field, a magnetic field, etc. However, some forms of short-range wireless communication may require that the transmitter and receiver be (i) in close proximity (e.g., 10 mm or less), (ii) within a line of sight, or both. Such usage restrictions may limit the applications in which short-range wireless communication can be used. For example, the maximum distance between a transmitter and a receiver may be relatively small (e.g., 10 mm or less) due to (i) the low operating power and (ii) the electromagnetic propagation characteristics at the operating frequency. When designing products that incorporate short-range wireless communication, such distance limitations may be challenging to overcome, particularly when mechanical or design limitations dictate further separation (e.g., greater than 10 mm) between the transmitter and receiver.

SUMMARY

This Summary provides a simplified form of concepts that are further described below in the Detailed Description. This Summary is not intended to identify key or essential features and should therefore not be used for determining or limiting the scope of the claimed subject matter.

In some embodiments, a computing device comprises a head that can be docked to a base. The base includes a base transceiver to transmit (or receive) a signal via a first port of a waveguide. The waveguide also includes at least a second port and a third port. The head includes a head transceiver to transmit (or receive) the signal via the waveguide. When the head is in a first position relative to the base, the head transceiver may transmit (or receive) the signal via the second port. When the head is in a second position relative to the base, the head transceiver may receive transmit (or receive) the signal via the third port.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 2A illustrates signal flow through a waveguide from a base to a head, according to some embodiments.

FIG. 2B illustrates signal flow through a waveguide from a head to a base when the head is an open position, according to some embodiments.

FIG. 2C illustrates signal flow through a waveguide from a head to a base when the head is a closed position, according to some embodiments.

FIG. 5 illustrates a cross-section of a head docked to a base in an open position according to some embodiments.

DETAILED DESCRIPTION

Figure 1A:
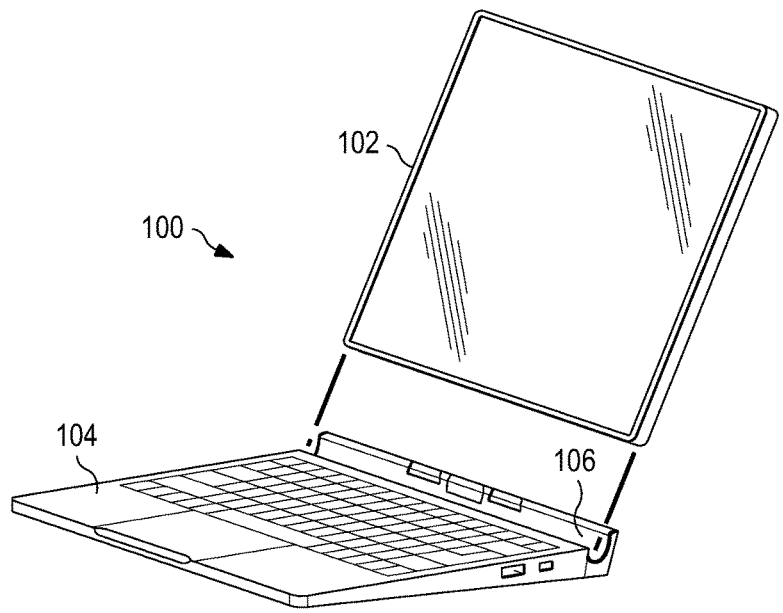
FIG. 1A illustrates a head of a computing device detached from a base of the computing device, according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

As computing devices, such as tablets, notebooks, wireless phones, and the like continue to proliferate, many of these devices may be designed using two or more components. For example, a computing device, such as a "2-in-1" computing device, may include two components, such as a head and a base. The head component may include a touchscreen display device and may be independently usable as a computing device, such as a tablet computer or a wireless phone. In addition, attaching (also referred to as docking) the head to the base may enable the head to access resources that are included in the base, such as one or more input devices (e.g., keyboard, touch pad, keypad, etc.), one or more storage devices (e.g., random access memory (RAM), read only memory (ROM), other types of memory, disk drives, other types of storage devices, etc.), one or more ports (e.g., a universal serial bus (USB) port, a serial port, a digital video interface (DVI) port, a high definition multimedia interface (HDMI) port, a card reader (e.g., for reading a compact flash card, a secure digital (SD) card, etc.), another type of resource, or any combination thereof. In this way, the 2-in-1 computing device may be used as two devices, e.g., either as a first type of computing device (e.g., such as a tablet, when using just the head) or as a second type of computing device (e.g., such as a laptop, when the head is docked to the base).

In a conventional 2-in-1 computing device, the head may be electrically coupled to the base using electrical contacts that enable the head and base to communicate with each other (e.g., to enable the head to access the resources of the base, etc.). However, having exposed electrical contacts on the head and the base may result in the electrical contacts becoming corroded, dirty, worn, damaged, etc. Therefore, a 2-in-1 computing device that uses short-range wireless communication (e.g., 60 GHz near field wireless communication), may enable the head to communicate with the base (e.g., when the head is docked with the base) while avoiding problems caused by the electrical contacts, such as corrosion, dirt, wear, damage, etc.

A 2-in-1 computing device may be designed to operate in several modes of operation. For example, in a tablet mode, the head may be decoupled from the base and used as a tablet computing device independent of the base. In an open position, the head may be docked with the base such that the head is at an angle (e.g., typically at least 5 degrees) relative to the base to enable the combined device to operate in a manner similar to a laptop.

In a first closed position, the head may be docked with the base such that the display screen of the head is facing the base and not viewable. In this mode, the dock may be electronically coupled to external input devices (e.g., keyboard, mouse, etc.) and to external display devices (e.g., one or more monitors, one or more projector(s), etc.). In the first closed position, the resources, such as the processors and storage devices, of the combined device may be used without using the display screen of the head and without using the input devices (e.g., keyboard, trackball, etc.) of the base. In a second closed position, the head may be docked with the base such that the display screen of the head is facing away from the base and is viewable. The dock may be electronically coupled to external input devices (e.g., keyboard, mouse, etc.) and, in some cases, to external display devices (e.g., one or more monitors, one or more projector(s), etc.).

In the second closed position, the resources, such as the processors and storage devices in the head and in the base, of the combined device may be used along with the display screen of the head. However, the input devices (e.g., keyboard, trackball, etc.) of the base may not be used. In this mode, the display screen of the head may be used by itself (e.g., as the sole display device) or in conjunction with one or more external display devices (e.g., monitors, projectors, etc.).

When the head is docked to the base, short-range wireless communication may be used to enable communications between the head and the base. For example, a head transmitter/receiver (referred to hereinafter as a "transceiver") may be included in the head and a base transceiver may be included in the base. The short-range wireless communication may have operational limitations such that communications between the head transceiver and the base transceiver are possible when the head transceiver and the base transceiver are (i) in close proximity (e.g., 10 mm or less) and (ii) within a line of sight. Communications between the head transceiver and the base transceiver may not be possible when the first transceiver and the second transceiver are greater than 10 mm apart or not within a line of sight.

To enable short-range wireless communication between a head and a base in a 2-in-1 computing device capable of operating in multiple operational modes, one or more waveguides may be used to receive a transmission from a transmitter (e.g., a first transceiver) and transmit the transmission to a receiver (e.g., a second transceiver). A waveguide is a structure that acts as a transmission medium to guide waves, such as electromagnetic waves, between the first transceiver and the second transceiver. For example, the waveguide may vibrate in response to receiving a signal (e.g., carrier signal) from a transmitter and transmit the vibrations to a receiver. The waveguide may be made from a material such as plastic, metal, glass, wood, another type of material, or any combination thereof. In some implementations, the waveguide may include a particular type of plastic, such as polystyrene, that has a relatively low propagation loss at transmission frequencies used by the transceivers. The waveguide may include a dielectric material, e.g., an electrical insulator (e.g., polystyrene or other plastic) that can be polarized by an applied electric field. The waveguide may be hollow, solid, or portions of the waveguide may be hollow.

Thus, one or more transceivers and one or more waveguides may be used to enable communications between a head and a base of a 2-in-1 computing device to enable different modes of operating, including an open position and one or more closed positions.

FIG. 1A illustrates a head of a computing device 100 detached from a base of the computing device, according to some embodiments. The computing device 100 may include a head 102 and a base 104. The head 102 may include a display device, one or more processors, and computer-readable storage media to store instructions. The one or more processors may access the computer-readable storage media to execute the instructions to perform various functions. For example, as illustrated in FIG. 1A, the head 102 may be detached from the base 104 for use as a tablet computing device. The head 102 may receive input via a touch screen display using a finger (or other appendage), a stylus, a keyboard superimposed on the touch screen display, another type of touch input mechanism, or any combination thereof. The head 102 may receive input via buttons, a microphone (e.g., using voice recognition), another type of input mechanism, or any combination thereof.

The base 104 may include resources, such as one or more input devices (e.g., a keyboard, a touch pad, etc.), one or more storage devices (e.g., random access memory (RAM), disk drives, etc.), one or more input/output (I/O) ports (e.g., a universal serial bus (USB) port, a high definition multimedia interface (HDMI) port, a card reader (e.g., for reading a compact flash card, a secure digital (SD) card, etc.), another type of computing resource, or any combination thereof. A portion (e.g., one end) of the base 104 may include a dock 106. The dock 106 may be shaped in such a way that one end (e.g., "bottom") of the head 102 may be placed in the dock 106 to couple the head 102 to the base 104.

When the head 102 is inserted into the dock 106 of the base 104, the head 102 and the base 104 may be capable of contactless communication with each other. When coupled to the base 104, the head 102 may access one or more of the resources of the base 104. For example, the head 102 may receive input from the input devices of the base 104. The head 102 may display the input received from the base on the touchscreen display device of the head 102. The head 102 may store data on a storage device of the base 104. The head 102 may retrieve data stored on a storage device of the base 104 (or connected to the base 104 using an I/O port) and display at least part of the data on the touchscreen display device of the head 102. Of course, other examples of a head and a base may have other I/O devices and components.

The base 104 may be communicatively coupled to one or more input devices, such as a keyboard, a mouse, a trackball, or other type of input device that may be used in place of, or in addition to, input devices included in the base 104. The base 104 may be communicatively coupled to one or more display devices, such as a monitor, a projector, or other type of display device that may be used in place of, or in addition to, the display device included in the head 102.

Figure 1B:
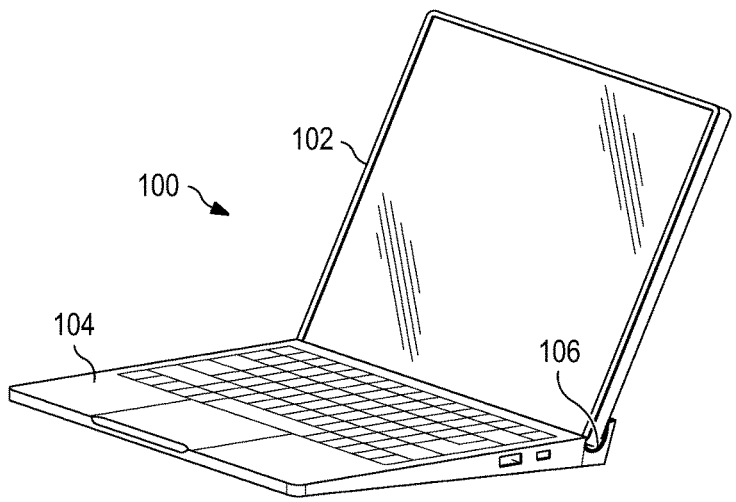
FIG. 1B illustrates a head of a computing device attached to a base of the computing device in an open position, according to some embodiments.
Figure 1C:
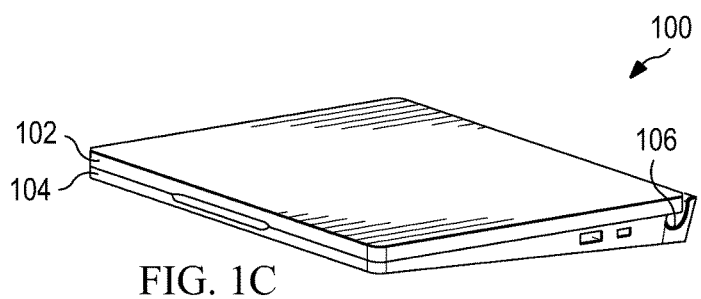
FIG. 1C illustrates a head of a computing device attached to a base of the computing device in a closed position, according to some embodiments.

The head 102 may be capable of being physically coupled to the base 104 and later de-coupled from the base 104. The head 102 and the base 104 may operate in multiple modes, include a tablet mode (e.g., as illustrated in FIG. 1A), an open position (e.g., as illustrated in FIG. 1B), and a closed position 112 (e.g., as illustrated in FIG. 1C). In FIG. 1A, the head 102 may be used as a table device, independent of the base 104.

FIG. 1B illustrates how the head 102 of the computing device 100 may be attached to the base 104 of the computing device 100 in an open position, according to some embodiments. For example, the head 102 may be placed into the dock 106 of (e.g., docked with) the base 104 with the head 102 tilted at an angle relative to the base 104 such that the display screen of the head 102 may be viewed (and interacted with if the display screen is a touchscreen display). The display screen of the head 102 may face forwards or backwards.

FIG. 1C illustrates how the head 102 may be attached to the base 104 of the computing device 100 in a closed position, according to some embodiments. For example, the head 102 may be docked with the base 104 and the head 102 positioned such that one of the large surfaces of the head 102 is in close proximity with the base 104, as illustrated in FIG. 1. The display screen of the head 102 may face down (e.g., if the display screen of the head 102 is not being used) or may face up (e.g., if the display screen of the head 102 is being used).

FIGS. 2A, 2B, and 2C illustrate signal flow via a waveguide between a base to a head, according to some embodiments. One or more waveguides may be positioned in the dock 106 of FIG. 1. The waveguides may acts as a transmission medium at a particular transmission frequency to propagate (e.g., transmit) a signal received from one transceiver to another transceiver. For example, a representative waveguide 202 may include at least three ports, such as a first port 204, a second port 206, and a third port 208. The base may include one or more base transceivers, such as a representative base transceiver 210. The head may include one or more head transceivers, such as a representative head transmitter 212. In some implementations, the waveguide 202 may be solid. In other implementations, at least portions of the waveguide 202 may be hollow. The material from which the waveguide 202 may be selected to provide relatively low signal loss for the frequencies being transmitted (e.g., carried) by the waveguide 202. For example, in the range of 50 GHz to 70 GHz, the waveguide 202 may comprise polystyrene because of the dielectric properties for polystyrene that exhibit a relatively low loss tangent, e.g., an amount of signal level loss when a signal is traveling through the solid waveguide is relatively small.

FIG. 2A illustrates signal flow when a base is sending a signal to a head that is docked in either an open position or a closed position. The first port 204 may receive a signal from the base transceiver 210. The waveguide 202 may transmit (e.g., guide) the signal to the second port 206 and to the third port 208. For example, if a signal is 100% at the first port 204 and there is approximately 10% propagation loss, approximately 40% of the signal may be output at the second port 206 and approximately 40% of the signal may be output at the third port 208. When the head 102 is docked to the base 104 in an open position, the base transceiver 210 may transmit a signal at the first port 204. The signal received at the first port 204 may be transmitted by the waveguide 202 to the second port 206. The head transceiver 212 may receive the signal that is output by the waveguide 202 at the second port 206. When the head 102 is docked to the base 104 in a closed position, the base transceiver 210 may transmit a signal at the first port 204. The signal received at the first port 204 may be transmitted by the waveguide 202 to the third port 208. The head transceiver 212 may receive the signal that is output at the third port 208.

FIG. 2B illustrates signal flow through a waveguide from a head to a base when the head is an open position, according to some embodiments. The head transceiver 212 transmits a signal that is received at the second port 206 and transmitted (e.g., guided) by the waveguide 202 to the first port 204. The base transceiver 210 receives the signal at the first port 204.

FIG. 2C illustrates signal flow through a waveguide from a head to a base when the head is a closed position, according to some embodiments. The head transceiver 212 transmits a signal that is received at the third port 208. The waveguide 202 transmits the signal to the first port 204. The base transceiver 210 receives the signal at the first port 204. Due to the longer path, propagation loss when transmitting in the closed position (e.g., between the third port 208 and the first port 204) may be slightly more than the propagation loss in the open position (e.g., between the second port 206 and the first port 204).

The transceivers 210, 212 and waveguide 202 may operate at radio frequencies in the extremely high frequency (EHF) band, e.g., between 30 Gigahertz (GHz) and 300 GHz. For example, in a particular embodiment, the transceivers 210, 212 may communicate at approximately 60 GHz. In some embodiments, the transceivers 210, 212 may be implemented using a technology such as complementary metal oxide semiconductor (CMOS). The transceivers 210, 212 may be capable of transmitting and receiving signals with a bandwidth of at least 5 Gigabits per second (Gbps). For example, a typical configuration may achieve a throughput of between 5 Gbps and 10 Gbps. The transceivers 210, 212 and the waveguide 202 may not make contact with each other. The transmitter component of the transceivers 210, 212 is used to transmit signals and the receiver component of the transceivers 210, 212 is used to receive signals.

Thus, one or more waveguides, such as the waveguide 202, may be used to transmit and receive communication signals between base transceivers and head transceivers, such as between the base transceiver 210 and the head transceiver 212. Each waveguide may have multiple ports to enable communication signals to be transmitted and received in different operating modes, such as the open position 110 and the closed position 112.

Figure 3:
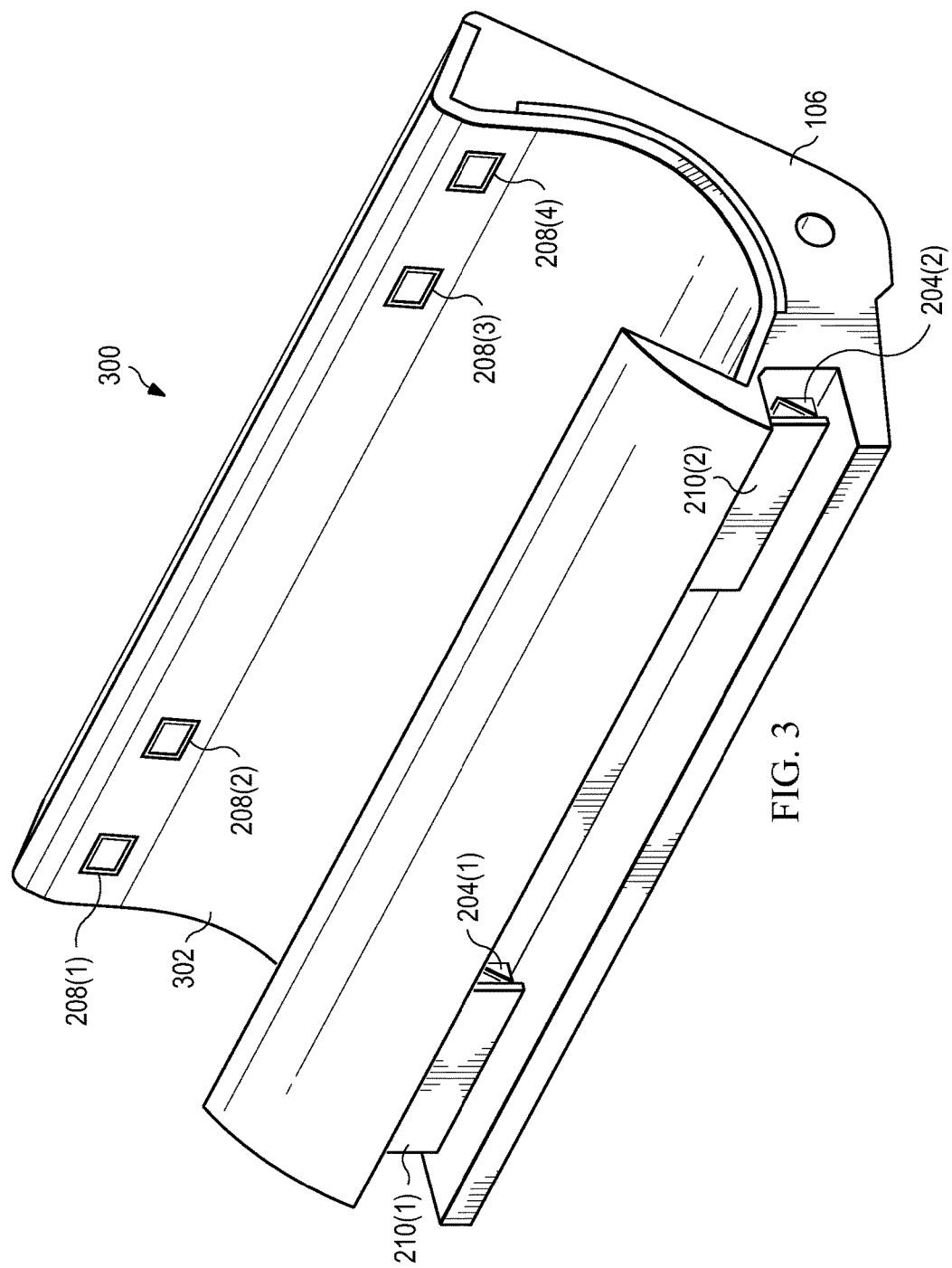
FIG. 3 illustrates a first view of a dock portion of a base according to some embodiments.
Figure 4:
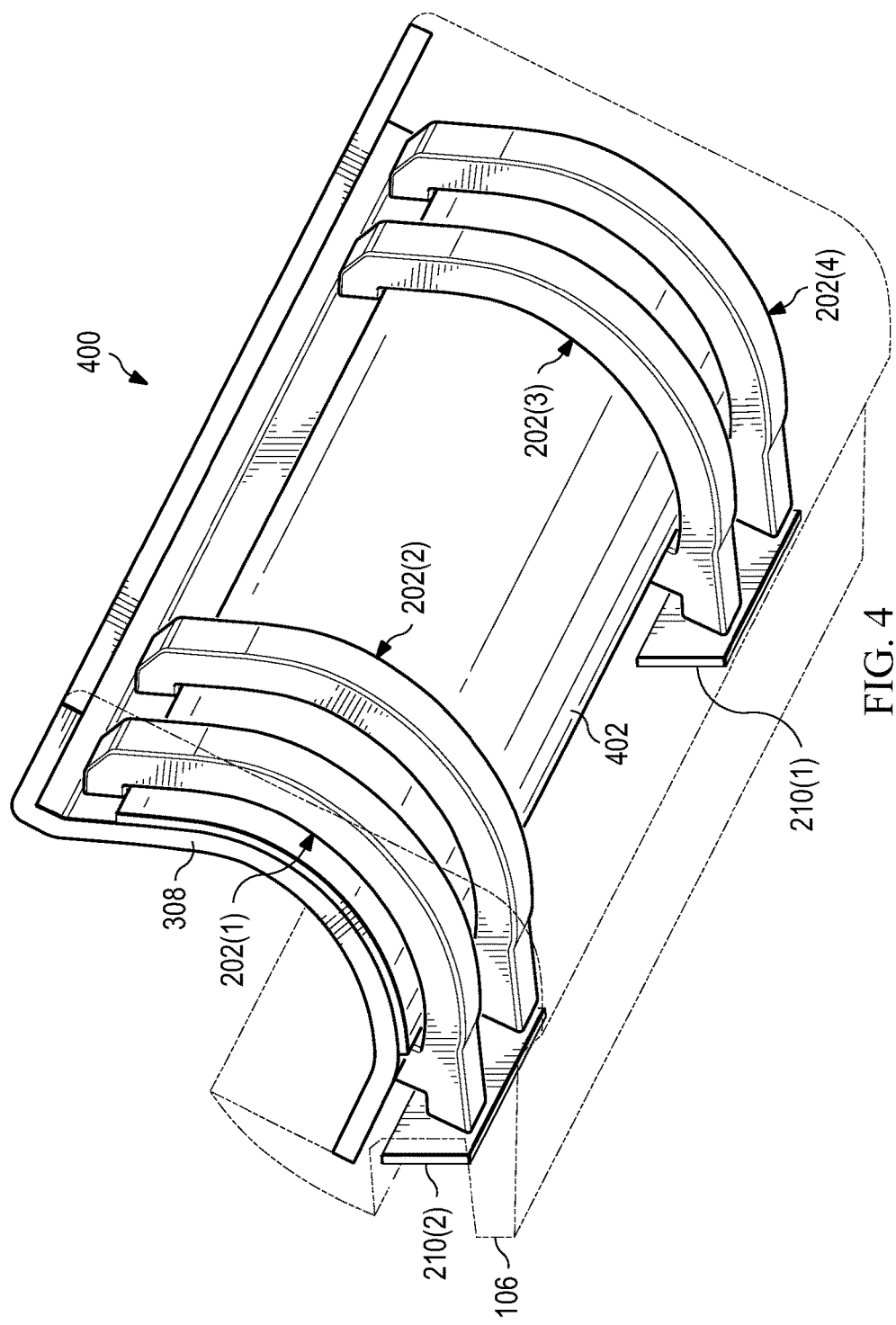
FIG. 4 illustrates a second view of a dock portion of a base according to some embodiments.

FIG. 3 illustrates a first view (e.g., top view) of the dock 106 portion of the base 104 according to some embodiments. The dock 106 may be created using a metal (e.g., aluminum, steel, or the like) or a metal alloy. In some implementations, the waveguide 202 of FIG. 2 may be attached to an outer surface of the dock (e.g., as illustrated in FIG. 4). While four waveguides are illustrated in FIG. 3, other implementations may include more than four waveguides or less than four waveguides. The ports 204, 206, 208 of each waveguide may mate with (e.g., may be inserted into) tunnels in the dock 106, as illustrated in FIG. 3. One or more base transceivers 210 may be affixed to the dock 106, with each base transceiver 210 located in close proximity (e.g., less than 10 mm) to the first port 204 of each waveguide.

An inner surface of the dock 106 may include an insert 302. When the head 102 is inserted into the dock 106, the insert 302 may make contact with portions of the head 102. The insert 302 may be comprised of a polymer, such as plastic, a metal, metal alloy, another type of material or any combination thereof.

FIG. 4 illustrates a second view (e.g., bottom view) of the dock 106 portion of the base 104 according to some embodiments. Purely for illustration purposes, four waveguides 202 are depicted in FIG. 4. FIG. 4 corresponds to a bottom view of the dock 106 illustrated in FIG. 3.

At least a portion of the outer surface of the dock 106 may be coated with a liner 402. For example, the liner 402 may be a metalized coating that is applied using paint that is infused with nanoparticles. The liner 402 may be designed to keep signals transmitted via the waveguides 202 from leaking and to avoid crosstalk between each of the waveguides 202. In some implementations, the dielectric waveguides 202 may be plated with a highly metallic coating of copper-based or aluminum-based paint of at least 2 micrometers (μm) thickness to minimize signal loss and improve channel isolation. Sheet resistance between a farthest end of each of the plated waveguides 202 may be less than 1 ohm.

FIG. 5 illustrates a cross-section of a head docked to a base in an open position according to some embodiments. When the head 102 is docked with the base 104 (e.g., by inserting one end of the head 102 into the dock 106) in the open position 110, the head transceiver 212 may be positioned in close proximity (e.g., less than 10 mm) to the second port 206. In the dock 206, the base transceiver 210 is positioned in close proximity (e.g., less than 10 mm) to the first port 204. A back surface 502 of the head 102 may be positioned to touch portions of the insert 302. A screen 504 of a display device included in the head 102 may be positioned to face forward (e.g., towards a user).

When the base 104 is communicating with the head 102, the base 104 may transmit data 506 to the base transceiver 210. The base transceiver 210 may receive the data 506, encode the data 506 into a signal 508 (e.g., an EHF signal) and transmit the signal 508. The waveguide 202 may receive the signal 508 at the first port 204 and carry the signal 508 to the second port 206. The head transceiver 212 may receive the signal 508 at the second port 206, convert (e.g., decode) the signal 508 into the data 506, and send the data 506 to the head 102.

When the head 102 is communicating with the base 104, the head 102 may transmit the data 506 to the head transceiver 212. The head transceiver 212 may encode the data 506 into the signal 508 (e.g., an EHF signal) and transmit the signal 508. The waveguide 202 may receive the signal 508 at the second port 206 and carry the signal 508 to the first port 204. The base transceiver 210 may receive the signal 508 at the first port 204, convert (e.g., decode) the signal 508 into the data 506, and send the data 506 to the base 104.

Figure 6:
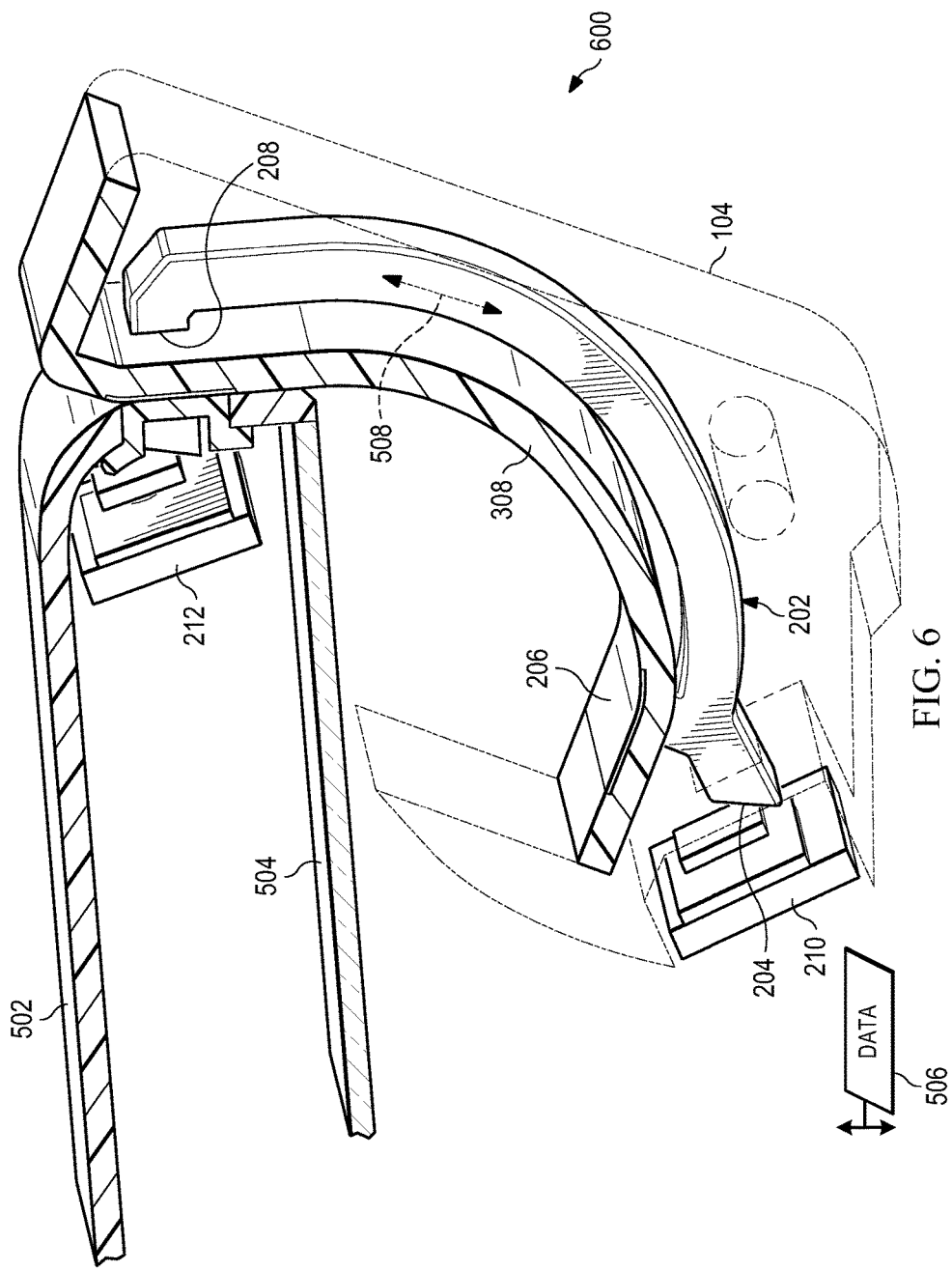
FIG. 6 illustrates a cross-section of a head docked to a base in a closed position according to some embodiments.

FIG. 6 illustrates a cross-section of a head docked to a base in a closed position according to some embodiments. When the head 102 is docked with the base 104 in the closed position 112, the head transceiver 212 may be positioned in close proximity (e.g., less than 10 mm) to the third port 208. In the dock 206, the base transceiver 210 is located in close proximity (e.g., less than 10 mm) to the first port 204. A back surface 502 of the head 102 may be positioned to touch portions of the insert 302. As illustrated in FIG. 6, the screen 504 of the display device in the head 102 may be positioned to face down, towards the base 104. Alternately, the screen 504 of the display device in the head 102 may be positioned to face up, towards a user (e.g., with the back surface 502 facing down, towards the base 104).

When the base 104 is communicating with the head 102, the base 104 may transmit data 506 to the base transceiver 210. The base transceiver 210 may receive the data 506, encode the data 506 into a signal 508 (e.g., approximately 60 Ghz) and transmit the signal 508. The waveguide 202 may receive the signal 508 at the first port 204 and transmit the signal 508 to the third port 208. The head transceiver 212 may receive the signal 508 at the third port 208, convert (e.g., decode) the signal 508 into the data 506, and send the data 506 to the head 102.

When the head 102 is communicating with the base 104, the head 102 may transmit the data 506 to the head transceiver 212. The head transceiver 212 may encode the data 506 into the signal 508 (e.g., approximately 60 Ghz) and transmit the signal 508. The waveguide 202 may receive the signal 508 at the third port 208 and transmit the signal 508 to the first port 204. The base transceiver 210 may receive the signal 508 at the first port 204, convert (e.g., decode) the signal 508 into the data 506, and send the data 506 to the base 104.

Figure 7:
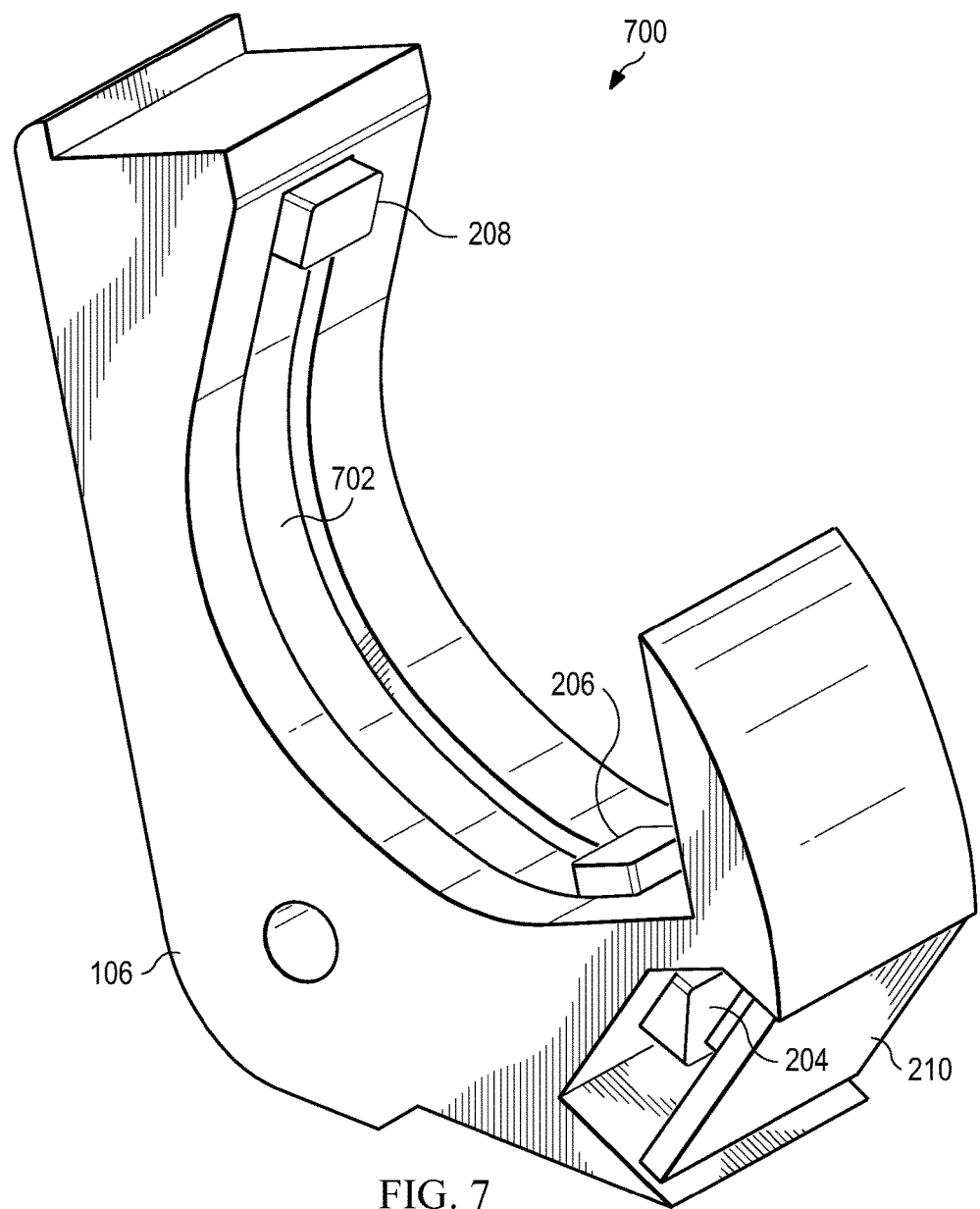
FIG. 7 illustrates a view of a dock portion of a base that includes an embedded waveguide according to some embodiments.

FIG. 7 illustrates a view of a dock portion of a base that includes an embedded waveguide according to some embodiments. FIG. 4 illustrated an example of how, in some implementations, the waveguides 202 are attached to an outside of the dock 106. FIG. 7 illustrates an example of how, in other implementations, a waveguide 702 may be embedded within the dock 106. While a single waveguide is shown in FIG. 7, multiples of the waveguide 702 may be embedded into the dock 106. The advantages with embedding the waveguide 702 in the dock 106 include less crosstalk between signals carried by the waveguide 702 due to the signal shielding provided by the dock 106.

Figure 8:
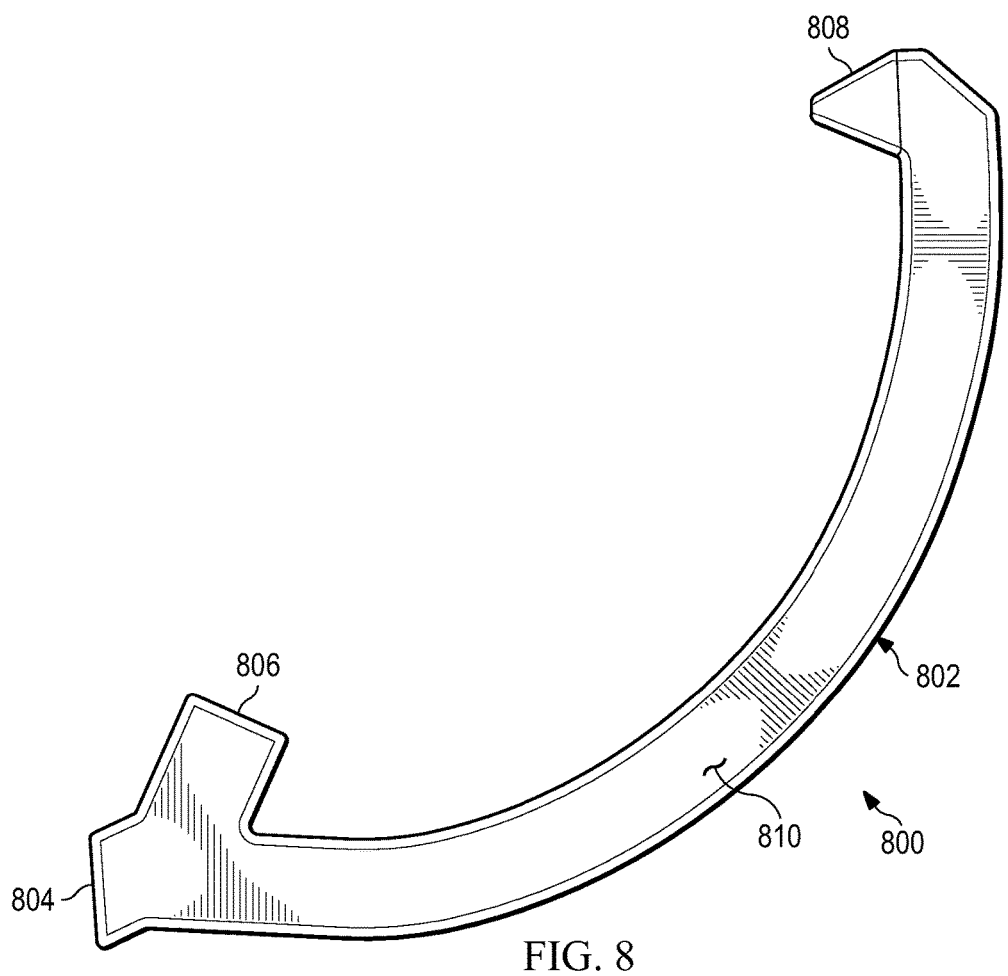
FIG. 8 illustrates a waveguide having a geometric-shaped port according to some embodiments.

FIG. 8 illustrates a waveguide having a geometric-shaped port according to some embodiments. A waveguide 802 may include a first port 804, a second port 806, and a third port 808. The waveguide 802 may include a metallic coating 810 (e.g., paint infused with nanoparticles) to shield a signal being carried by the waveguide 802. One or more of the ports, such as the third port 808, may have a geometric-shape, such as a square frustum (also known as a clipped pyramid), a triangular frustum, a pentagonal frustum, a polyhedron, or other geometric-shape. The geometric-shaped third port 808 may act as an impedance transformer to reduce reflections, e.g., such as those caused by abrupt terminations. For example, the geometric-shaped third port 808 may gradually transform reduce an impedance of the waveguide 802, thereby reducing reflections caused by abrupt terminations.

Figure 9:
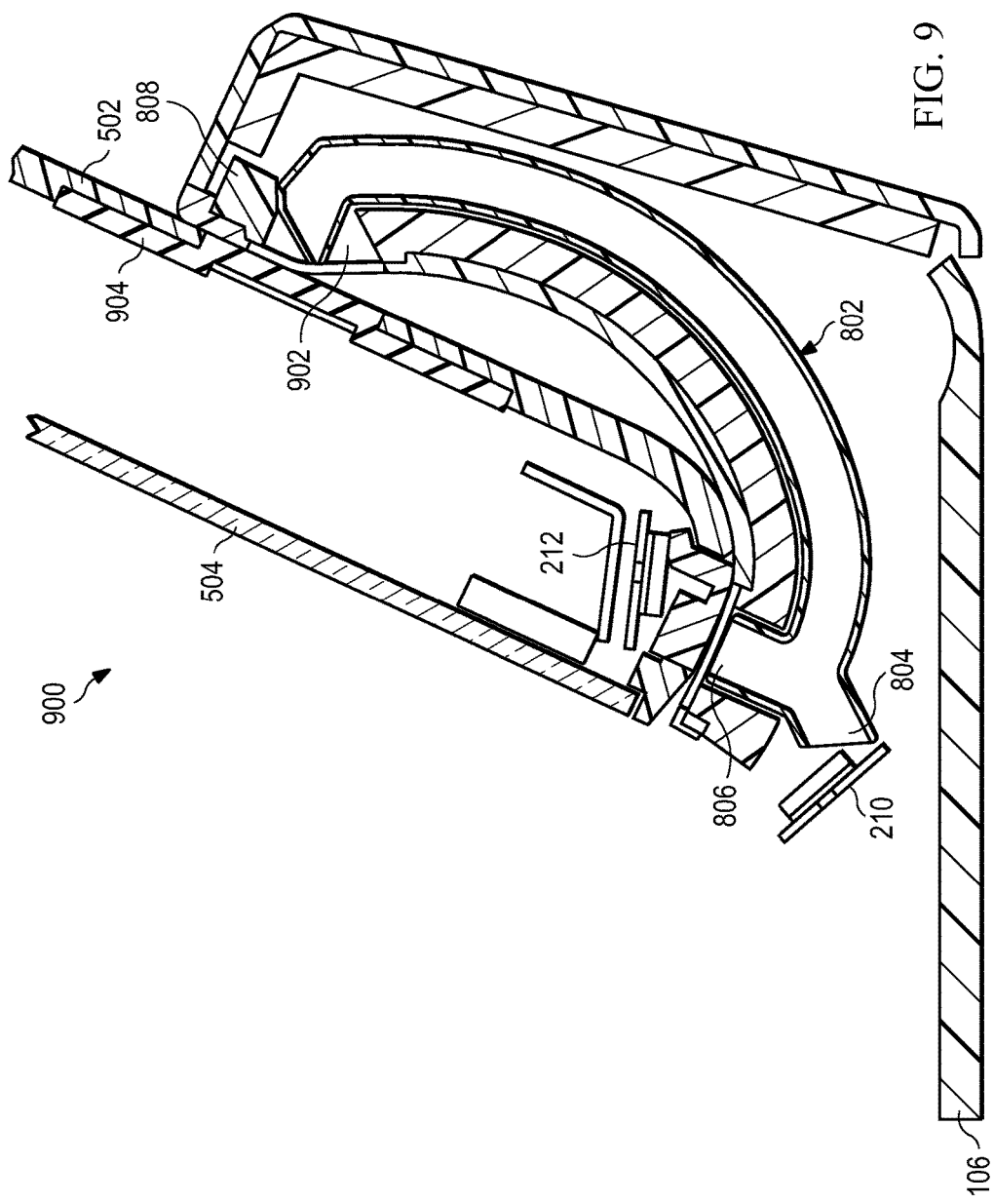
FIG. 9 illustrates a cross-section of a head docked to a base that includes a flared opening according to some embodiments.

FIG. 9 illustrates a cross-section of a head docked to a base that includes a flared opening according to some embodiments. The dock 106 may include a flared opening 902 to accommodate a geometric-shaped port, such as the third port 808 of the waveguide 802. The back surface 502 (e.g., of the head 102) may include a dielectric insert 904 molded into the back surface 502 to absorb energy while in open mode, thereby reducing reflections for an unused port of the waveguide 802. For example, when the head 102 is docked to the base 104 in an open position (e.g., with the screen of the head 102 at an angle relative to the base 104), the second port 806 is unused because the head 102 and the base 104 communicate using the first port 804 and the third port 808. When the head 102 is docked to the base 104 in a closed position (e.g., with the screen of the head 102 facing down or up relative to the base 104), the third port 808 is unused because the head 102 and the base 104 communicate using the first port 804 and the second port 806. Thus, the dielectric insert 904 molded into the back surface 502 may absorb reflections and reduce reflections for the unused port of the waveguide 802.

Figure 10:
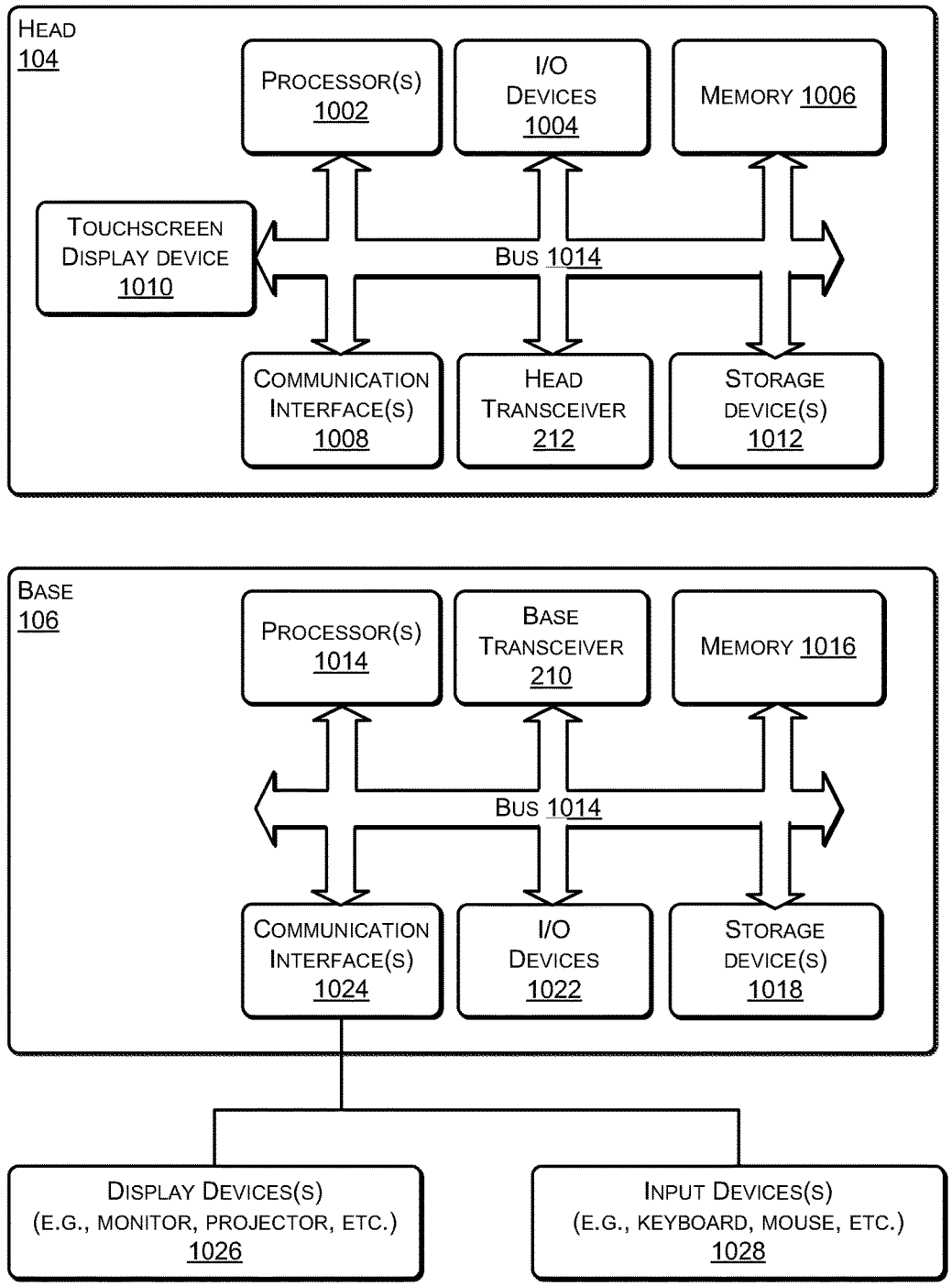
FIG. 10 illustrates an example configuration of a head and base of a computing device that can be used to implement the systems and techniques described herein.

FIG. 10 illustrates an example configuration of a head and a base of a computing device that can be used to implement the systems and techniques described herein. The head 102 may include one or more processors 1002, one or more input/output (I/O) devices 1004, a memory 1006, one or more communication interfaces 1008, and the head transceiver 212. In some embodiments, the head 102 may include one or more storage devices 1012. The touchscreen display device 1010 may be capable of receiving input via an appendage (e.g., a finger), an instrument (e.g., a stylus), or other type of input mechanism that is capable of generating touch. The base 104 may include one or more processors 1014, the base transceiver 210, a memory 1016, one or more storage devices 1018, one or more I/O devices 1022, and one or more communication interfaces 1024.

The I/O devices 1004, 1022 may each include, but are not limited to, one or more of a keyboard, a keypad, a touch pad, a mouse, a trackball, a speaker, a microphone, a camera, another type of input device, or any combination thereof. The communication interfaces may include interfaces compatible with wired protocols, such as Ethernet, high definition media interface (HDMI), digital video interface (DVI), Data Over Cable Service Interface Specification (DOCSIS), digital subscriber line (DSL), or the like. The communication interfaces compatible with wireless protocols, such as code division multiple access (CDMA), global system mobile (GSM), WiFi (e.g., 802.11), BlueTooth, or the like. The storage devices 1012, 1018 may include mass storage devices, such as disk drives, solid state drives (SSDs), etc.

Processors 1002, 1014 may be a microprocessor, controller, a programmable logic device such as a Field Programmable Gate Array (FPGA), an application specific integrated circuit (ASIC), or other hardware resource operable to provide computing device functionality for the head 102 and the base 104, respectively.

Memory 1006, 1016 may be any form of volatile or non-volatile memory including, magnetic media, optical media, random access memory (RAM) including dynamic RAM (DRAM) and static RAM (SRAM), read-only memory (ROM), erasable/programmable memory, solid state memory such as flash memory, removable media, or any other suitable local or remote memory component or components. In particular embodiments, memory 1006, 1016 may include random access memory (RAM). This RAM may be volatile memory. Memory 1006, 1016 may include one or more memories. Memory 1006, 1016 may store any suitable data or information utilized by the computing device 100, including one or more software modules embedded in a computer-readable medium, and/or encoded logic incorporated in hardware. In particular embodiments, memory 1006 may include main memory for storing instructions for processors 1002 to execute and memory 1016 may include main memory for storing instructions for processors 1014 to execute. In particular embodiments, one or more memory management units (MMUs) may reside between the processors 1002 and memory 1006 and facilitate accesses to memory 1006 requested by processors 1002 and one or more memory management units (MMUs) may reside between the processors 1014 and memory 1016 and facilitate accesses to memory 1016 requested by processors 1014. As used herein, memory 1006, 1016 do not include purely transitory media, such as signals and communication media. As such, memory is a form of non-transitory computer-readable media. As used herein, non-transitory computer-readable media includes one or more of optical storage, magnetic storage, RAM, ROM, solid-state memory such as flash memory, a hard disk drive, a floppy drive, tape storage, a smart card, an integrated circuit, and so forth.

External display devices 1026 may be communicatively coupled to the base 106 via one or more of the communication interfaces 1024 (e.g., digital video interface (DVI), high definition media interface (HDMI), etc.). The display devices 1026 may include monitors, projectors, or other types of display devices. External input devices 1028 may be communicatively coupled to the base 106 via one or more of the communication interfaces 1024 (e.g., universal serial bus (USB), etc.). The input devices 1028 may include a keyboard, a mouse, a trackball, a touch input device, a microphone (e.g., audio input device), a camera (e.g., video input device), or other type of input device.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

What is claimed is:

1. A computing device comprising:
   a base comprising:
      a base transceiver to:
         encode data into a signal; and
         transmit the signal;
   a waveguide to transmit the signal from a first port of the waveguide to a second port of the waveguide and to a third port of the waveguide; and
   a dock with an outer surface comprising a metalized coating and a flared opening to accommodate the third port of the waveguide.

2. The computing device of claim 1, further comprising:
   a head comprising:
      a head transceiver to:
         receive the signal at the second port of the waveguide; and
         decode the data from the signal.

3. The computing device of claim 2, wherein:
   inserting the head into the dock in a first position causes the head transceiver to receive the signal at the second port of the waveguide; and
   inserting the head into the dock in a second position causes the head transceiver to receive the signal at the third port of the waveguide.

4. The computing device of claim 1, wherein the waveguide is comprised of polystyrene.

5. The computing device of claim 1, wherein the metalized coating comprises paint infused with nanoparticles.

6. The computing device of claim 1, wherein the base transceiver transmits the signal at a frequency between about 50 GHz to about 70 GHz.

7. The computing device of claim 1, wherein the waveguide is attached to an outer portion of the dock.

8. The computing device of claim 1, wherein the waveguide is embedded into the dock.

9. A method comprising:
   attaching a head of a computing device to a dock that in a base of the computing device;
   encoding, by a base transceiver of the base, data into a signal;
   receiving, at a first port of a waveguide, the signal from the base transceiver;
   transmitting the signal, using the waveguide, from the first port of the waveguide to a second port of the waveguide;
   decoding, by a head transceiver of the head, the data from the signal; and
   sending the data to a component in the base; wherein;
      a metallic coating is deposited on an outer surface of the dock; and
      the dock includes a flared opening to accommodate a third port.

10. The method of claim 9, wherein the base transceiver transmits the signal at a frequency between about 30 GHz to about 300 GHz.

11. The method of claim 9, further comprising:
    detaching the head from the dock;
    re-attaching the head to the dock in a second position;
    encoding, by the head transceiver, second data into a second signal;
    receiving, at the third port of the waveguide, the second signal from the head transceiver;
    transmitting the second signal, using the waveguide, from the third port of the waveguide to the first port of the waveguide;
    receiving, by the base transceiver, the second signal at the first port of the waveguide; and
    decoding, by the base transceiver, the second data from the second signal.

12. The method of claim 11, wherein a shape of the third port comprises a frustum.

13. The method of claim 11, further comprising inserting the third port into the flared opening.

14. The method of claim 9, wherein the waveguide is comprised of a dielectric material.

15. The method of claim 9, wherein at least a portion of the waveguide has a metallic coating.

16. The method of claim 9, wherein the metallic coating comprises paint infused with nanoparticles.

17. A computing device comprising:
    a base comprising:
       a base transceiver to:
          encode data into a signal; and
          transmit the signal; and
       a waveguide to:
          receive the signal transmitted from the base transceiver at a first port of the waveguide; and
          guide the signal from the first port to a second port of the waveguide; and
       a dock having a metallic coating deposited on an outer surface of the dock, wherein the dock includes a flared opening to accommodate a third port of the waveguide.

18. The computing device of claim 17, further comprising:
    a head comprising:
       one or more processors;
       one or more computer-readable storage media; and
       a head transceiver to:
          receive the signal at the second port of the waveguide;
          decode the data from the signal; and
          send the data to a head component of the head.

19. The computing device of claim 18, wherein:
    the head transceiver is configured to:
       receive second data from the head component;
       encode the second data into a second signal; and
       transmit the second signal at the second port of the waveguide;
    the waveguide is configured to:
       receive the second signal transmitted at the second port of the waveguide; and
       guide the second signal from the second port of the waveguide to the first port of the waveguide; and the base transceiver is configured to:
    receive the second signal at the first port of the waveguide;
    decode the second data from the second signal; and
    send the second data to a base component.
20. The computing device of claim 17, further comprising:
a head comprising:
    one or more processors;
    one or more computer-readable storage media; and
    a head transceiver to:
        receive the signal at the third port of the waveguide;
        decode the data from the signal; and
        send the data to a head component of the head.

* * * * *